United States Patent [19]
Liberti, Jr. et al.

[11] Patent Number: 5,533,062
[45] Date of Patent: Jul. 2, 1996

[54] METHOD AND APPARATUS FOR CARRIER TRACKING AND DEMODULATION

[75] Inventors: Joseph C. Liberti, Jr., Blacksburg, Va.;
Douglas I. Averst, Delray Beach, Fla.;
Tony R. Branch; Stephen R. Carsello,
both of Boynton Beach, Fla.

[73] Assignee: Motorola, Inc., Schaumburg, Ill.

[21] Appl. No.: 316,956

[22] Filed: Oct. 3, 1994

[51] Int. Cl.⁶ .......................... H04L 27/10; H04L 27/22; H04L 27/14; H04L 7/00
[52] U.S. Cl. .......................... 375/334; 375/272; 375/326; 375/355; 329/300; 329/302
[58] Field of Search ............................ 375/272, 326, 375/334, 344, 355; 329/300, 302

[56] References Cited

U.S. PATENT DOCUMENTS

| | | | |
|---|---|---|---|
| 4,468,792 | 8/1984 | Baker | 375/272 |
| 4,669,094 | 5/1987 | Van Rumpt | 375/344 |
| 5,091,921 | 2/1992 | Minami | 329/302 |
| 5,293,408 | 3/1994 | Takehashi | 375/334 |
| 5,414,736 | 5/1995 | Hasegawa | 375/334 |

*Primary Examiner*—Stephen Chin
*Assistant Examiner*—Vijay Shankar
*Attorney, Agent, or Firm*—R. Louis Breeden

[57] ABSTRACT

A frequency shift keyed receiver (214, 220, 218) estimates a carrier frequency and demodulates (1020) a symbol value associated with the carrier frequency. During symbol intervals, the receiver (214, 220, 218) receives a radio signal including symbol values (502–518) corresponding to predetermined frequency offsets (604, 606) from a carrier frequency. The radio signal is digitized (1008) during a symbol interval, and then converted (1010) into a frequency domain signal. The frequency domain signal is stored (1012), and additional symbol intervals are converted to obtain a plurality of frequency domain signals, which are processed to generate (1016) a composite frequency domain signal (702, 704). A windowing function (706) of predetermined shape is convolved (1018) with the composite frequency domain signal (702, 704) to locate a frequency distribution therein that corresponds to the predetermined frequency offsets (604, 606). The carrier frequency (708) is estimated from the location of the frequency distribution, and utilized to demodulate (1020) the symbol values.

24 Claims, 7 Drawing Sheets

METHOD AND APPARATUS FOR CARRIER TRACKING AND DEMODULATION

FIELD OF THE INVENTION

This invention relates in general to radio communication receivers, and more specifically to a method and apparatus in a frequency shift keyed receiver for estimating a received carrier frequency and for demodulating symbol values associated therewith.

BACKGROUND OF THE INVENTION

In a multiple-subchannel, non-coherent, binary frequency shift keyed (FSK) receiver, one method of making symbol decisions for each subchannel is to compare the energy in the information band above the subchannel carrier frequency to the energy in the information band below the subchannel carrier frequency. Because it is possible for the subchannel carrier frequency to drift off center by a substantial amount relative to the amount of signal deviation, some technique must be used to estimate the subchannel carrier frequency.

One method of estimating the subchannel carrier frequency in a Fast Fourier Transform (FFT) based receiver has been to average a predetermined number of successive FFTs and to estimate the subchannel carrier frequency to be located at the center of energy for each subchannel. This has been accomplished by forming a vector containing a pointwise sum of the magnitudes squared of the predetermined number of past FFTs, and then convolving a rectangular windowing function of predetermined width over the vector to determine a frequency index at the center of the rectangle, which index maximizes the output of the convolution.

Unfortunately, this technique is highly sensitive to noise and to any imbalance in the types of symbols transmitted. In a binary FSK system, for example, if the numbers of "ones" and "zeros" transmitted are not identical, the center of energy for the subchannel will be skewed to one side of the true carrier frequency. The carrier frequency estimate made by the rectangular windowing function will then be erroneous, and symbol decisions made therefrom can be degraded.

Thus, what is needed is a method and apparatus that will provide an improved estimate of the carrier frequency in the presence of an imbalance in the types of symbols transmitted. Such a method and apparatus is needed to provide a higher accuracy of symbol decoding.

SUMMARY OF THE INVENTION

One aspect of the present invention is a method for estimating a received carrier frequency and for demodulating a symbol value associated with the carrier frequency. The method is utilized in a frequency shift keyed (FSK) receiver. The FSK receiver receives a modulated radio signal comprising symbol values corresponding to predetermined frequency offsets from the received carrier frequency. The symbol values are received during serially transmitted symbol intervals. The method comprises the steps of digitizing the modulated radio signal during a symbol interval to form a plurality of digitized samples corresponding to the modulated radio signal over the symbol interval, and converting the plurality of digitized samples into a frequency domain signal corresponding to the modulated radio signal. The frequency domain signal comprises a first plurality of frequency domain samples corresponding to a plurality of frequencies identified by a plurality of frequency indexes. The method further comprises the steps of storing the first plurality of frequency domain samples in the frequency shift keyed receiver, and repeating the digitizing, converting, and storing steps for a predetermined number of the serially transmitted symbol intervals to obtain a second plurality of frequency domain samples corresponding to the predetermined number of the serially transmitted symbol intervals. The method also includes the step of summing squares of magnitudes of the second plurality of frequency domain samples stored for each of the corresponding plurality of frequencies to generate a composite frequency domain signal corresponding to the modulated radio signal received over the predetermined number of the serially transmitted symbol intervals. In addition, the method includes the steps of generating a frequency domain windowing function that increases sensitivity to frequency domain samples having frequency offsets corresponding to the predetermined frequency offsets, and convolving the composite frequency domain signal generated in the summing step with the frequency domain windowing function to determine a location of a frequency distribution of frequency domain samples, which frequency distribution corresponds to the predetermined frequency offsets. The method further comprises the steps of making an estimate of the received carrier frequency from the location determined in the convolving step, and demodulating the symbol value corresponding to one of the serially transmitted symbol intervals, based upon the estimate of the received carrier frequency.

Another aspect of the present invention is an apparatus for estimating a received carrier frequency and for demodulating a symbol value associated with the carrier frequency. The apparatus is utilized within a frequency shift keyed (FSK) receiver. The FSK receiver receives a modulated radio signal comprising symbol values corresponding to predetermined frequency offsets from the received carrier frequency. The symbol values are received during serially transmitted symbol intervals. The apparatus comprises an analog-to-digital (A/D) converter for digitizing the modulated radio signal during a symbol interval to form a plurality of digitized samples corresponding to the modulated radio signal over the symbol interval, and a frequency domain converter coupled to the A/D converter for converting the plurality of digitized samples into a frequency domain signal corresponding to the modulated radio signal. The frequency domain signal comprises a first plurality of frequency domain samples corresponding to a plurality of frequencies identified by a plurality of frequency indexes. The apparatus further comprises a memory coupled to the frequency domain converter for storing the first plurality of frequency domain samples in the frequency shift keyed receiver, and a first repeater coupled to the A/D converter and coupled to the frequency domain converter and to the memory for repeating the digitizing, converting, and storing for a predetermined number of the serially transmitted symbol intervals to obtain a second plurality of frequency domain samples corresponding to the predetermined number of the serially transmitted symbol intervals. The apparatus also includes a summing element coupled to the memory for summing squares of magnitudes of the second plurality of frequency domain samples stored for each of the corresponding plurality of frequencies to generate a composite frequency domain signal corresponding to the modulated radio signal received over the predetermined number of the serially transmitted symbol intervals. In addition, the apparatus includes a windowing function generator for generating a frequency domain windowing function that increases sensitivity to frequency domain samples having frequency offsets corresponding to the predetermined frequency offsets, and a convolving element coupled to the summing element and coupled to the windowing function generator for convolving the composite frequency domain signal generated by the summing element with the frequency domain windowing function to determine a location of a frequency distribution of frequency domain samples, which frequency distribution corresponds to the predetermined frequency offsets. The apparatus further comprises a carrier frequency estimator coupled to the convolving element for making an estimate of the received carrier frequency from the location determined by the convolving element, and a symbol demodulator coupled to the carrier frequency estimator for demodulating the symbol value corresponding to one of the serially transmitted symbol intervals, based upon the estimate of the received carrier frequency.

Another aspect of the present invention is a selective call base station for use in a selective call communication system. The selective call base station comprises a controller for controlling the selective call base station, and a transmitter coupled to the controller for transmitting selective call signals to selective call receivers operating in the selective call communication system. The selective call base station further comprises a receiver coupled to the controller for receiving a modulated radio signal from a transmitter within one of the selective call receivers, the modulated radio signal communicating symbol values corresponding to predetermined frequency offsets from a received carrier frequency of the modulated radio signal. The symbol values are received during serially transmitted symbol intervals. The receiver is also coupled to an apparatus for estimating the received carrier frequency and for demodulating the symbol values associated with the received carrier frequency. The apparatus comprises an analog-to-digital (A/D) converter for digitizing the modulated radio signal during a symbol interval to form a plurality of digitized samples corresponding to the modulated radio signal over the symbol interval, and a frequency domain converter coupled to the A/D converter for converting the plurality of digitized samples into a frequency domain signal corresponding to the modulated radio signal. The frequency domain signal comprises a first plurality of frequency domain samples corresponding to a plurality of frequencies identified by a plurality of frequency indexes. The apparatus further comprises a memory coupled to the frequency domain converter for storing the first plurality of frequency domain samples in the frequency shift keyed receiver, and a first repeater coupled to the A/D converter and coupled to the frequency domain converter and to the memory for repeating the digitizing, converting, and storing for a predetermined number of the serially transmitted symbol intervals to obtain a second plurality of frequency domain samples corresponding to the predetermined number of the serially transmitted symbol intervals. The apparatus also includes a summing element coupled to the memory for summing squares of magnitudes of the second plurality of frequency domain samples stored for each of the corresponding plurality of frequencies to generate a composite frequency domain signal corresponding to the modulated radio signal received over the predetermined number of the serially transmitted symbol intervals. In addition, the apparatus comprises a windowing function generator for generating a frequency domain windowing function that increases sensitivity to frequency domain samples having frequency offsets corresponding to the predetermined frequency offsets, and a convolving element coupled to the summing element and coupled to the windowing function generator for convolving the composite frequency domain signal generated by the summing element with the frequency domain windowing function to determine a location of a frequency distribution of frequency domain samples, which frequency distribution corresponds to the predetermined frequency offsets. The apparatus further comprises a carrier frequency estimator coupled to the convolving element for making an estimate of each of the received carrier frequencies from the location determined by the convolving element, and a symbol demodulator coupled to the carrier frequency estimator for demodulating a symbol value corresponding to one of the serially transmitted symbol intervals, based upon the estimate of the received carrier frequency.

DESCRIPTION OF THE PREFERRED EMBODIMENT

Figure 1:
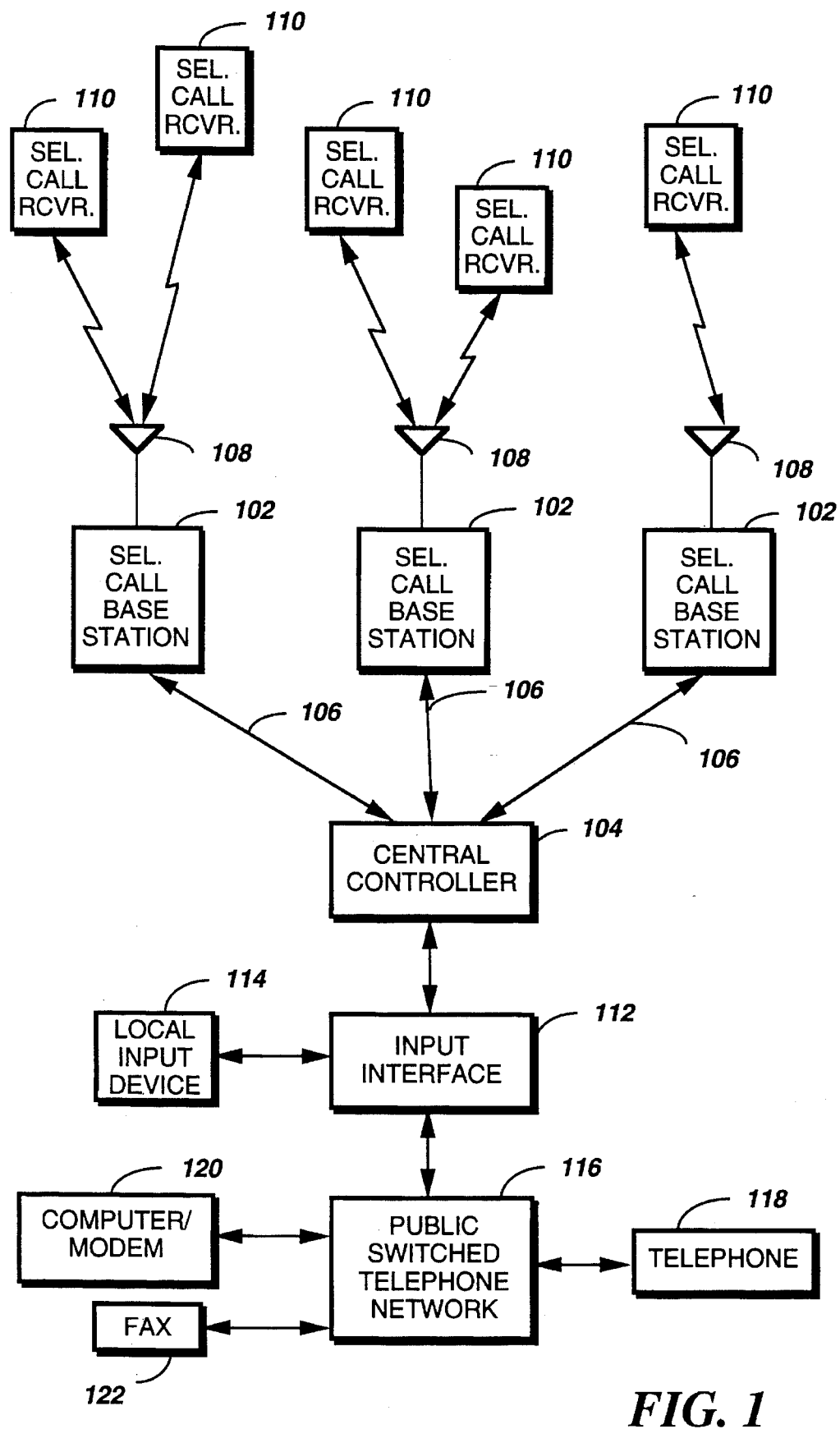
FIG. 1 is an electrical block diagram of a selective call communication system in accordance with the preferred embodiment of the present invention.

With reference to FIG. 1, an electrical block diagram of a selective call communication system in accordance with the preferred embodiment of the present invention comprises a plurality of selective call base stations 102 coupled by communication links 106 to a conventional central controller 104 for controlling the selective call base stations 102. The central controller 104 is preferably similar to the MPS 2000™ paging control center manufactured by Motorola, Inc. of Schaumburg, Ill. Other similar controllers can be utilized as well for the central controller 104. The selective call base stations 102 transmit and receive radio signals to and from a plurality of selective call receivers 110 via antennas 108. The radio signals comprise selective call addresses and messages transmitted to the selective call receivers 110 and acknowledgments received from the selective call receivers 110. It will be appreciated that the selective call receivers 110 can also originate messages other than acknowledgments. The central controller 104 is coupled to an input interface 112 for accepting selective call originations from a local input device 114, e.g., a conventional keyboard/display terminal, and from the public switched telephone network (PSTN) 116. Selective call originations from the PSTN 116 can be generated, for example, from a conventional telephone 118, a conventional computer/modem 120, or a conventional facsimile machine 122 coupled to the PSTN 116 in a manner that is well known in the art.

Transmissions between the selective call base stations 102 and the selective call receivers 110 preferably utilize a well-known selective calling signaling protocol, such as the Golay Sequential Code (GSC) or Post Office Code Standardization Advisory Group (POCSAG) protocol. Outbound transmissions from the selective call base stations 102 preferably utilize binary frequency shift keyed (FSK) modulation, operating in the range of five-hundred to twenty-four-hundred bits-per-second (bps). Inbound transmissions from the selective call receivers 110 to the selective call base stations 102 preferably utilize narrowband binary FSK modulation at a rate of one-hundred bps, transmitted on at least one subchannel. It will be appreciated that other signaling protocols, transmission rates, and FSK modulation schemes can be utilized as well for either or both transmission directions.

Figure 2:
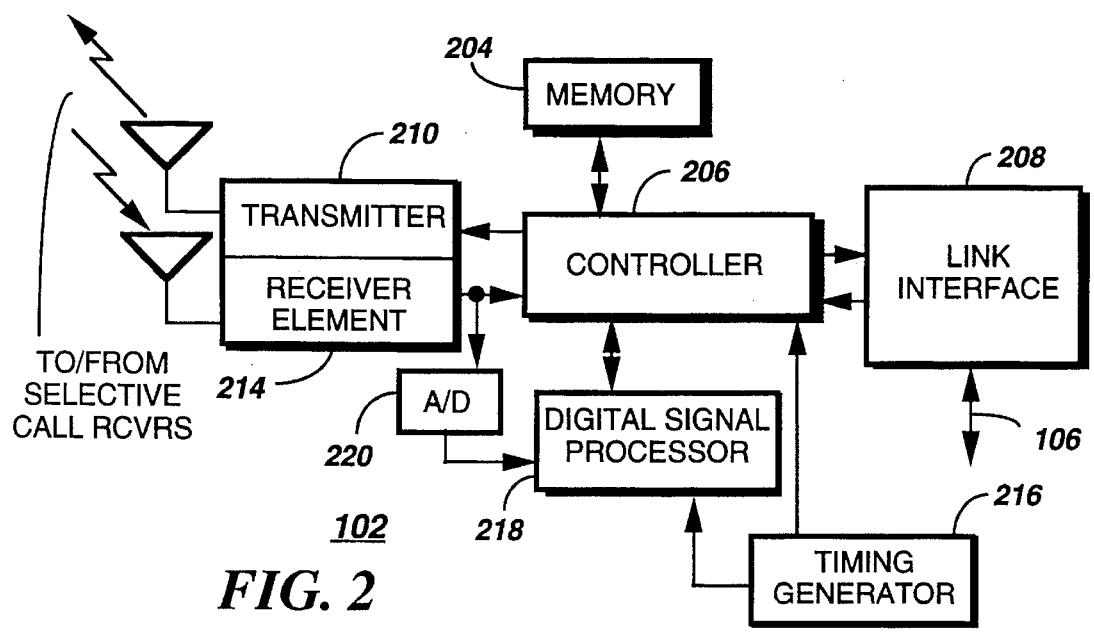
FIG. 2 is an electrical block diagram of a selective call base station in accordance with the preferred embodiment of the present invention.

With reference to FIG. 2, an electrical block diagram of the selective call base station 102 in accordance with the preferred embodiment of the present invention comprises a conventional link interface 208 coupled to the central controller 104 by the communication link 106. Selective call addresses and messages received from the central controller 104 are stored in a conventional memory 204 until the next transmission cycle.

The link interface 208 is coupled to a controller 206, which controls the operation of a conventional transmitter 210 and a conventional receiver element 214. An example of a controller suitable for use in the present invention is Motorola's MC6809 controller. A conventional timing generator 216, coupled to the controller 206, provides a high accuracy clock to maintain system timing for communication and synchronization of the selective call communication system including the selective call base stations 102 and the plurality of selective call receivers 110 by techniques known to one of ordinary skill in the art.

Operationally, the transmitter 210 transmits, to the plurality of selective call receivers 110, a signal which comprises a paging type message preferably on a first frequency at the beginning of the transmission cycle. Preferably, a group of the selective call receivers 110 are intended (addressed) by the transmitter 210 to receive a paging message. As is well known, the paging message before transmission is encoded with the appropriate address for addressing the group of selective call receivers of the plurality of selective call receivers 110. For example, and according to the preferred embodiment of the present invention, when a group of the plurality of the selective call receivers 110 have been paged, the selective call receivers 110 of the group that received the message preferably each will substantially simultaneously transmit acknowledgment responses during bit (symbol) intervals on temporarily assigned narrowband subchannels of a second communication channel operating on a second frequency. The receiver element 214 of the selective call base station 102 receives the acknowledgment responses. As is well known, the receiver element 214 demodulates the acknowledgment signals to produce preferably a baseband signal.

For each active subchannel, i.e., for each subchannel that is measured to have an acceptable signal-to-noise ratio, the baseband signal corresponding to a single symbol (bit) interval is converted (digitized) from an analog signal to a sampled digital signal by an analog-to-digital (A/D) converter 220, well-known to one of ordinary skill in the art. Preferably, the A/D converter 220 operates at 32,000 complex samples per second, and thus takes three-hundred-twenty complex samples of each bit at the one-hundred bit-per-second bit rate. The conversion by the A/D converter 220 is received, buffered over the symbol interval, and then converted into frequency domain samples corresponding to each symbol interval by a digital signal processor (DSP) 218. The DSP 218, for example, can include a Motorola's DSP56100 or a Texas Instrument's TMS3000 series digital signal processors. It will be appreciated that other similar DSPs can be used as well for the DSP 218, and that other sampling rates and bit rates can be selected for use in the selective call communication system. It also will be appreciated that the transmitter 210 can be positioned remotely from the other elements of the selective call base station 102, and that the selective call communication system can include receive-only stations similar to the selective call base station 102 but lacking the transmitter 210.

According to the preferred embodiment of the present invention, the DSP 218 converts and stores the frequency domain samples during each symbol interval on each active subchannel and continuously receives, converts, and stores the frequency domain samples until a plurality of frequency domain samples of the acknowledgment signals have been stored. The digitized samples are retrieved and converted into a frequency domain signal. Preferably, the DSP 218 performs a Fast Fourier Transform (FFT) on time domain samples of each symbol interval to generate the frequency domain signal, which comprises the plurality of acknowledgment signals received as a composite time domain signal from the responding selective call receivers 110 of the group of selective call receivers 110. The timing generator 216 is coupled to the DSP 218 to provide synchronization and timing for processing the plurality of digitized samples comprising the plurality of acknowledgment signals. The operation of the DSP 218 will be discussed in detail below.

Figure 3:
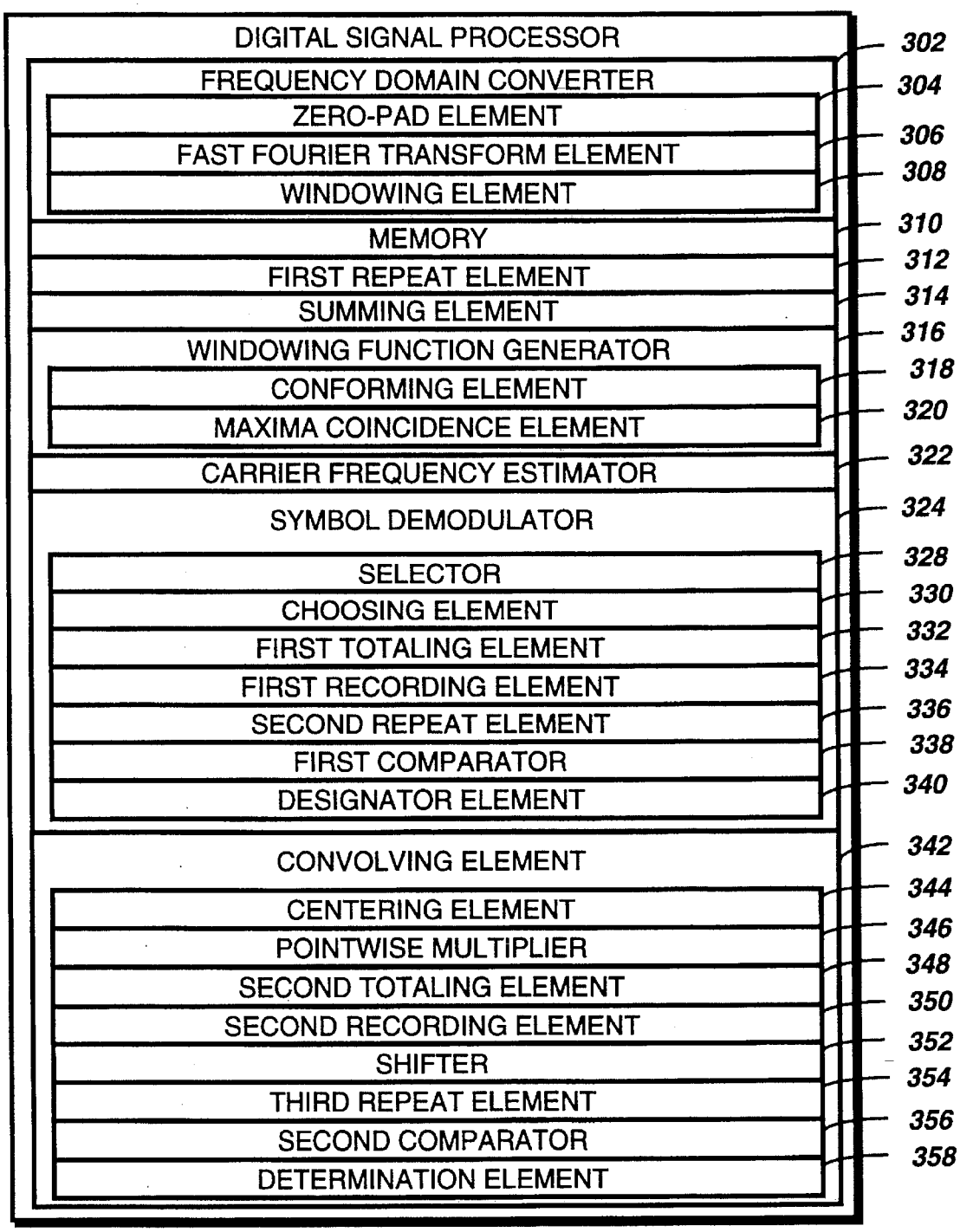
FIG. 3 is a diagram depicting firmware and memory elements in a digital signal processor in accordance with the preferred embodiment of the present invention.

With reference to FIG. 3, a diagram depicts firmware and memory elements in the DSP 218 for processing each active subchannel in accordance with the preferred embodiment of the present invention. The firmware elements comprise a frequency domain converter 302, including a zero-pad element 304 for increasing the number of digitized samples to an integer power of two, for compatibility with performing the FFT thereon. The frequency domain converter 302 further includes a windowing element 308 for applying a Hanning window to the digitized samples prior to increasing the number of digitized samples to an integer power of two. For improving the signal-to-noise ratio of the frequency domain signal, the Hanning window preferably matches a Hanning amplitude applied to each symbol by a transmitter 412 (FIG. 4) in the responding selective call receivers 110. In addition, the frequency domain converter 302 includes a Fast Fourier Transform element 306 for performing the FFT on the digitized samples after zero-padding, to generate a first plurality of frequency domain samples corresponding to a plurality of frequencies.

The DSP 218 further comprises a memory 310 for storing the first plurality of frequency domain samples, and a first repeat element 312 for repeating the digitizing, converting, and storing of the first plurality of frequency domain samples for a predetermined number, e.g., eight, of the serially transmitted symbol intervals to obtain a second plurality of frequency domain samples corresponding to the predetermined number of the serially transmitted symbol intervals. It will be appreciated that the memory 310 alternatively can be a conventional random access memory external to the DSP 218, as well. The DSP 218 also includes a summing element 314 for summing squares of magnitudes of the second plurality of frequency domain samples stored for each of the corresponding plurality of frequencies to generate a composite frequency domain signal that corresponds to the modulated radio signal received over the predetermined number of the serially transmitted symbol intervals. Also included in the DSP 218 is a windowing function generator 316 for generating a frequency domain windowing function that increases sensitivity to frequency domain samples having frequency offsets corresponding to the predetermined frequency offsets in accordance with the preferred embodiment of the present invention. The windowing function generator 316 comprises a conforming element 318 for conforming the frequency domain windowing function to an expected frequency domain distribution that matches that expected from a random FSK modulation after transmission through a predetermined multipath environment. Preferably, the conforming element 318 is a magnitude-versus-frequency response profile that has been empirically determined and then recorded in a non-volatile memory of the DSP 218. Alternatively, the conforming element 318 can be a mathematical function, e.g., a sinusoidal function, that algorithmically determines the magnitude-versus-frequency response profile.

Considering the general case of FSK modulation, the modulated radio signal in each subchannel during each symbol interval comprises M possible symbol values corresponding to M predetermined frequency offsets from the received carrier frequency. In parallel with this, the windowing function generator 316 also comprises a maxima coincidence element 320 for constructing a frequency domain windowing function 706 (FIG. 7) such that, when the frequency domain windowing function 706 is centered with respect to the received carrier frequency, the frequency domain windowing function 706 has M maxima that are coincident with the M predetermined frequency offsets. This means, for example, that for a binary FSK modulation there will be two maxima in the frequency domain windowing function 706, coincident with the two predetermined frequency offsets corresponding to the two possible symbol values (0, 1).

The DSP 218 further comprises a convolving element 342 for convolving the composite frequency domain signal generated by the summing element 314 with the frequency domain windowing function 706 to determine a location of a frequency distribution of frequency domain samples, which frequency distribution corresponds to the predetermined frequency offsets. The operation of the convolving element 342 will now be described.

The received carrier frequency of each subchannel can have a value above and below a nominal design carrier frequency within a predetermined tolerance range due to variations in transmitter and receiver frequency references. It follows that the frequencies corresponding to the possible symbol values can also vary above and below their corresponding nominal design values. The task of the convolving element 342 is to examine the frequency domain samples of the composite frequency domain signal, which comprises a plurality of previously received symbol intervals on each subchannel, and to locate a frequency distribution of frequency domain samples corresponding to the predetermined frequency offsets of the possible symbols. A plurality of symbol intervals are examined in order to increase the probability of including at least one of each of the possible symbols in the composite frequency domain signal.

Stated simply, the convolving element 342 looks for a distribution of peaks in the energy of the composite frequency domain signal which are offset in frequency by the same amount as the predetermined frequency offsets that correspond to the possible symbol values. Having located such a distribution of peaks in the energy of the frequency domain signal, the DSP 218 can then estimate the carrier frequency of the subchannel from the location of the distribution of the peaks.

In greater detail, the convolving element 342 comprises a centering element 344 for centering the frequency domain windowing function 706 (FIG. 7) at a first frequency index within the predetermined tolerance range. The convolving element 342 further comprises a pointwise multiplier 346 for computing a pointwise multiplication, i.e., a sample-by-sample multiplication, of the composite frequency domain signal by the frequency domain windowing function 706 centered at the frequency index to obtain a plurality of windowed energy values. The convolving element 342 also comprises a second totaling element 348 for totaling the plurality of windowed energy values to obtain a total energy value corresponding to the frequency index. In addition, the convolving element 342 includes a second recording element 350 for recording in the memory 310 the total energy value and the corresponding frequency index.

The convolving element 342 further comprises a shifter 352 for shifting the frequency domain windowing function 706 to recenter the frequency domain windowing function 706 at a next frequency index that has not yet been recorded by the second recording element 350. The convolving element 342 further comprises a third repeat element 354 for repeating the pointwise multiplication, totaling, recording, and shifting operations of the pointwise multiplier 346, the second totaling element 348, the second recording element 350, and the shifter 352 to form a plurality of recorded total energy values, the repeating continuing until every frequency index within the predetermined tolerance range has been recorded.

In addition, the convolving element 342 includes a second comparator 356 for comparing the plurality of total energy values recorded in the memory 310 with one another to find the largest recorded total energy value, and a determination element 358 for determining that the location of the frequency distribution of frequency domain samples corresponding to the predetermined frequency offsets is centered on the frequency index corresponding to the largest recorded total energy value.

The DSP 218 further comprises a carrier frequency estimator 322 for making an estimate of the received carrier frequency from the location determined by the convolving element. In a system utilizing balanced binary FSK modulation, for example, in which the frequency offsets corresponding to a binary "zero" and a binary "one" are equal offsets below and above the carrier frequency, the carrier frequency estimator 322 would estimate that the carrier is centered at the frequency index corresponding to the largest recorded total energy value. The operation of the DSP 218 in determining the carrier frequency will be further described herein below in the description of FIG. 7.

The DSP 218 further comprises a symbol demodulator 324 for demodulating the symbol value corresponding to one of the serially transmitted symbol intervals for the subchannel, based upon the estimate of the received carrier frequency. Briefly, the symbol demodulator 324 selects frequencies at each of the predetermined frequency offsets from the estimated carrier frequency that correspond to the possible symbol values as evaluation loci. Then the frequency domain signal is evaluated over a predetermined frequency range around each of the evaluation loci to obtain a total energy value corresponding to each of the predetermined frequency offsets. The one of the predetermined frequency offsets having the largest total energy value determines the symbol value for the symbol interval.

In greater detail, the symbol demodulator 324 comprises a selector 328 for selecting as an evaluation locus a frequency equal to one of the M predetermined frequency offsets from the estimate of the received carrier frequency. The symbol demodulator 324 also includes a choosing element 330 for choosing magnitude square values of samples of the frequency domain signal corresponding to the one of the serially transmitted symbol intervals over a predetermined frequency range around the evaluation locus, thereby forming a plurality of energy values associated with the one of the M predetermined frequency offsets. Also included in the symbol demodulator 324 is a first totaling element 332 for totaling the plurality of energy values to obtain a total energy value corresponding to the one of the M predetermined frequency offsets. In addition, the symbol demodulator 324 includes a first recording element 334 for recording the total energy value and the corresponding one of the M predetermined frequency offsets. The symbol demodulator 324 further comprises a second repeat element 336 for repeating the selecting, computing, totaling, and recording operations until the total energy value corresponding to each of the M predetermined frequency offsets has been computed and recorded. The symbol demodulator 324 also includes a first comparator 338 for comparing the total energy value corresponding to each of the M predetermined frequency offsets to determine a largest total energy value, and a designator element 340 for designating the symbol value that corresponds to the one of the M predetermined frequency offsets having the largest total energy value as the symbol value demodulated during the one of the serially transmitted symbol intervals.

Figure 4:
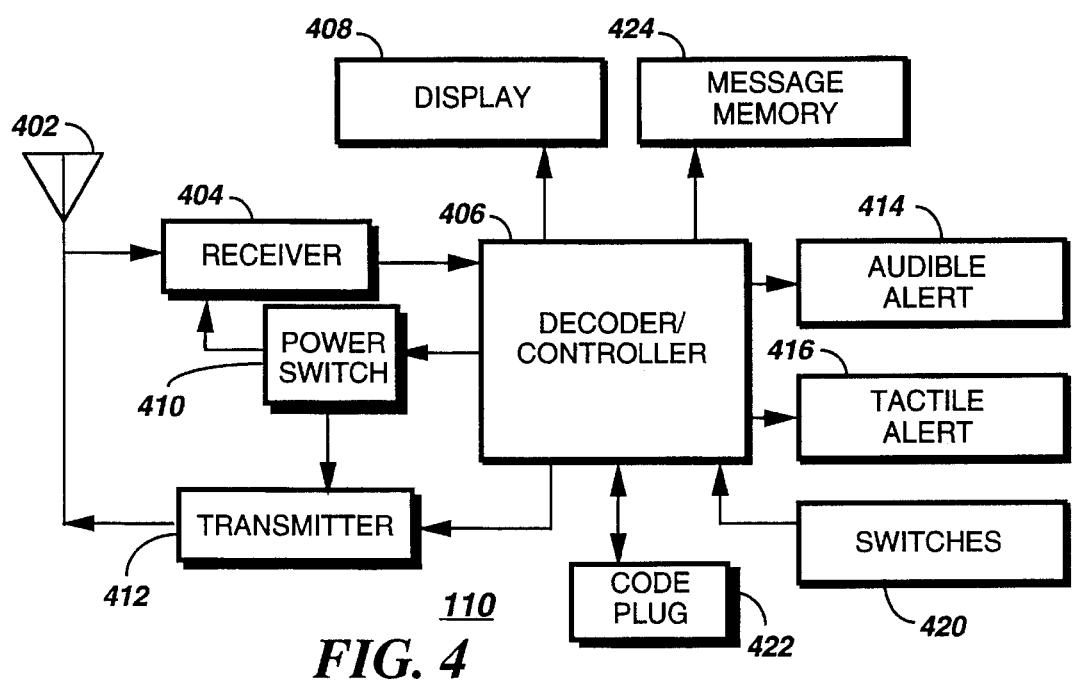
FIG. 4 is an electrical block diagram of a selective call receiver in accordance with the preferred embodiment of the present invention.

With reference to FIG. 4, an electrical block diagram of the selective call receiver 110 in accordance with the preferred embodiment of the present invention comprises an antenna 402 for intercepting the transmitted radio signals which are coupled to the input of a conventional receiver 404. The radio signals are preferably selective call (paging) message signals which provide, for example, a receiver address and an associated message, such as numeric or alphanumeric message. However, it will be appreciated that other well known paging signaling formats, such as tone only signaling or tone and voice signaling, would be suitable for use as well.

The receiver 404 processes the radio signals and produces at the output a data stream representative of demodulated data information. The demodulated data information is coupled into the input of a decoder/controller 406 which processes the information in a manner well known in the art. A transmitter 412 is coupled to the antenna 402 and to the decoder/controller 406. The transmitter 412 is preferably a conventional narrowband binary FSK transmitter operating at a bit rate of one-hundred bps. It will be appreciated that other FSK modulation techniques and bit rates can be used as well for the transmitter 412.

A power switch 410, coupled to the decoder/controller 406, is used to control the supply of power to the receiver 404, thereby providing a battery saving function, and to the transmitter 412 for transmitting the acknowledgment response subsequent to the receipt of a paging message, as will be further discussed in detail below.

For purposes of this illustration, it will be assumed that the POCSAG signaling format is utilized, although other signaling formats could be utilized as well. When the address is received by the decoder/controller 406, the received address is compared with one or more addresses stored in a code plug (or code memory) 422, and when a match is detected, an alert signal is generated to alert a user that a selective call message, or page, has been received. The alert signal is directed to an audible alerting device 414 for generating an audible alert or to a tactile alerting device 416 for generating a silent vibrating alert. Switches 420 allow the user of the selective call receiver to, among other things, select between the audible alert 414 and the tactile alert 416 in a manner well known in the art.

The message information which is subsequently received is stored in a message memory 424, preferably a conventional random access memory, and can be accessed by the user for display using one or more of the switches 420, which provide such additional functions as reset, read, and delete, etc. Specifically, by the use of appropriate functions provided by the switches 420, the stored message is recovered from the message memory 424 and processed by the decoder/controller 406 for displaying by a conventional display 408, which enables the user to view the message. The receipt of the message by the selective call receiver 110 can automatically generate the acknowledgment response to the selective call base station 102 to inform it that the message was successfully received. Preferably, the user will have the opportunity to input a message by using the switches 420 or some other input devices well known to one of ordinary skill in the arts. When the message is entered, the decoder/controller 406 processes the message by encoding an address derived from the received message to generate the acknowledgment response. The encoded acknowledgment response is then transmitted at a time synchronized by the radio signals received from the selective call base station 102 that originated the paging message, by techniques well known to one of ordinary skill in the art.

The decoder/controller 406 preferably is implemented utilizing a microcomputer similar to the MC68HC05 series microcomputer, manufactured by Motorola, Inc. of Schaumburg, Ill. It will be appreciated that other similar microcomputers can be used as well for the decoder/controller 406, and that the message memory 424 also can be included as a portion of the decoder/controller 406.

Figure 5:
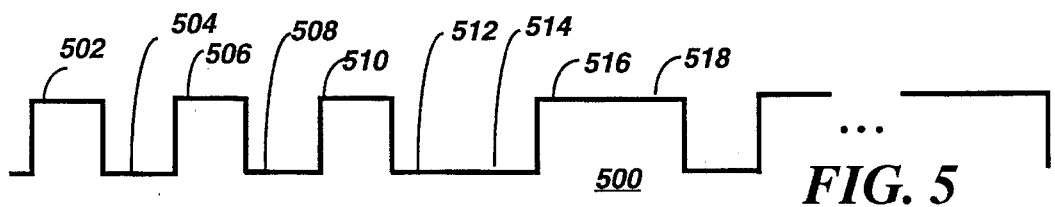
FIG. 5 is a timing diagram illustrating an example of a bit pattern of an acknowledgment signal of one of a group of selective call receivers in accordance with the preferred embodiment of the present invention.

With reference to FIG. 5, a timing diagram is shown illustrating an example of a bit pattern 500 of an acknowledgment signal of one of the group of the selective call receivers 110 in accordance with the preferred embodiment of the present invention. As discussed, the acknowledgment signal is transmitted at a lower bit rate than the paging signal from the selective call base station 102. The paging signal is, for example, within a range from five-hundred to twenty-four-hundred bps, while the acknowledgment signal is, for example, preferably one hundred bits-per-second. The bit pattern 500 illustrates an example of an acknowledgment signal of one of the selective call receivers 110 transmitted on one subchannel. The bit pattern 500 depicts bits 502, 506, 510, and 516–518 representing digital "ones" and bits 504, 508, and 512–514 representing digital "zeros". In each acknowledgment response values of the bits of course depend upon the information being conveyed.

Figure 6:
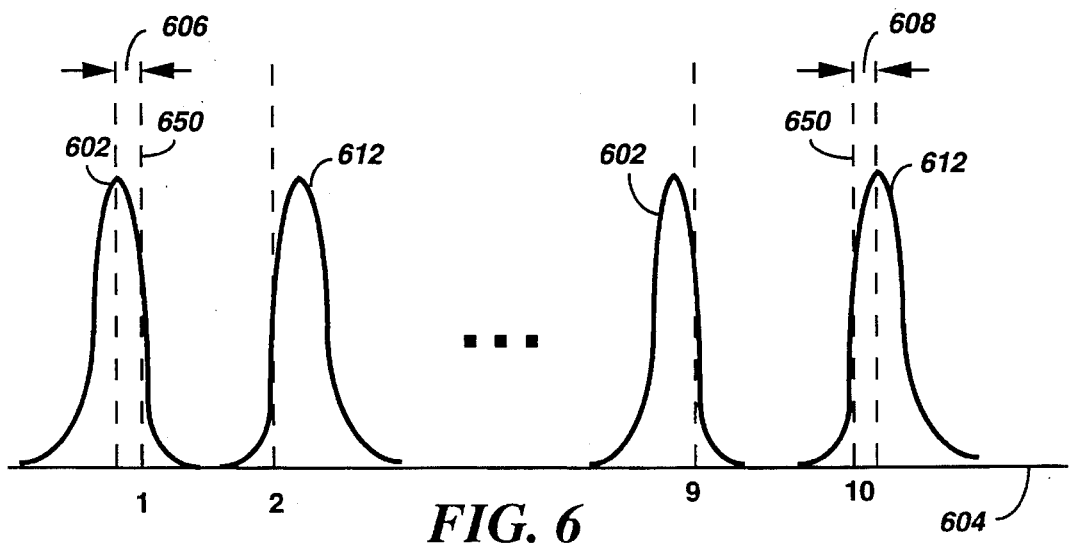
FIG. 6 is a signaling diagram depicting a frequency-domain signal generated in the selective call base station in accordance with the preferred embodiment of the present invention.

With reference to FIG. 6, a signaling diagram depicts a frequency-domain signal generated in the selective call base station 102 from the received acknowledgment signal in accordance with the preferred embodiment of the present invention. As discussed above, each symbol received by the selective call base station 102 during one of the symbol intervals on an active subchannel is converted into a corresponding frequency domain signal 602, 612. The horizontal axis 604 represents frequency. The vertical direction represents signal magnitude. The preferred modulation scheme is binary FSK with each of the simultaneously responding selective call receivers 110 assigned to a different subchannel. There are, for example, ten subchannels. The carrier frequency of each of the ten subchannels is located on a central axis 650, which marks the center of each subchannel. A received symbol value is determined from the frequency domain signal by utilizing the frequency domain windowing function 706 (FIG. 7) to estimate the received carrier frequency, after which the energy associated with each of the M predetermined frequency offsets from the carrier frequency is measured and compared, as is described in greater detail herein below. A binary "zero" is represented, for example, by the frequency domain signal 602 offset a predetermined amount 606 below the central axis 650 of the corresponding subchannel, while a binary "one" is represented by the frequency domain signal 612 offset a predetermined amount 608 above the central axis 650.

Figure 7:
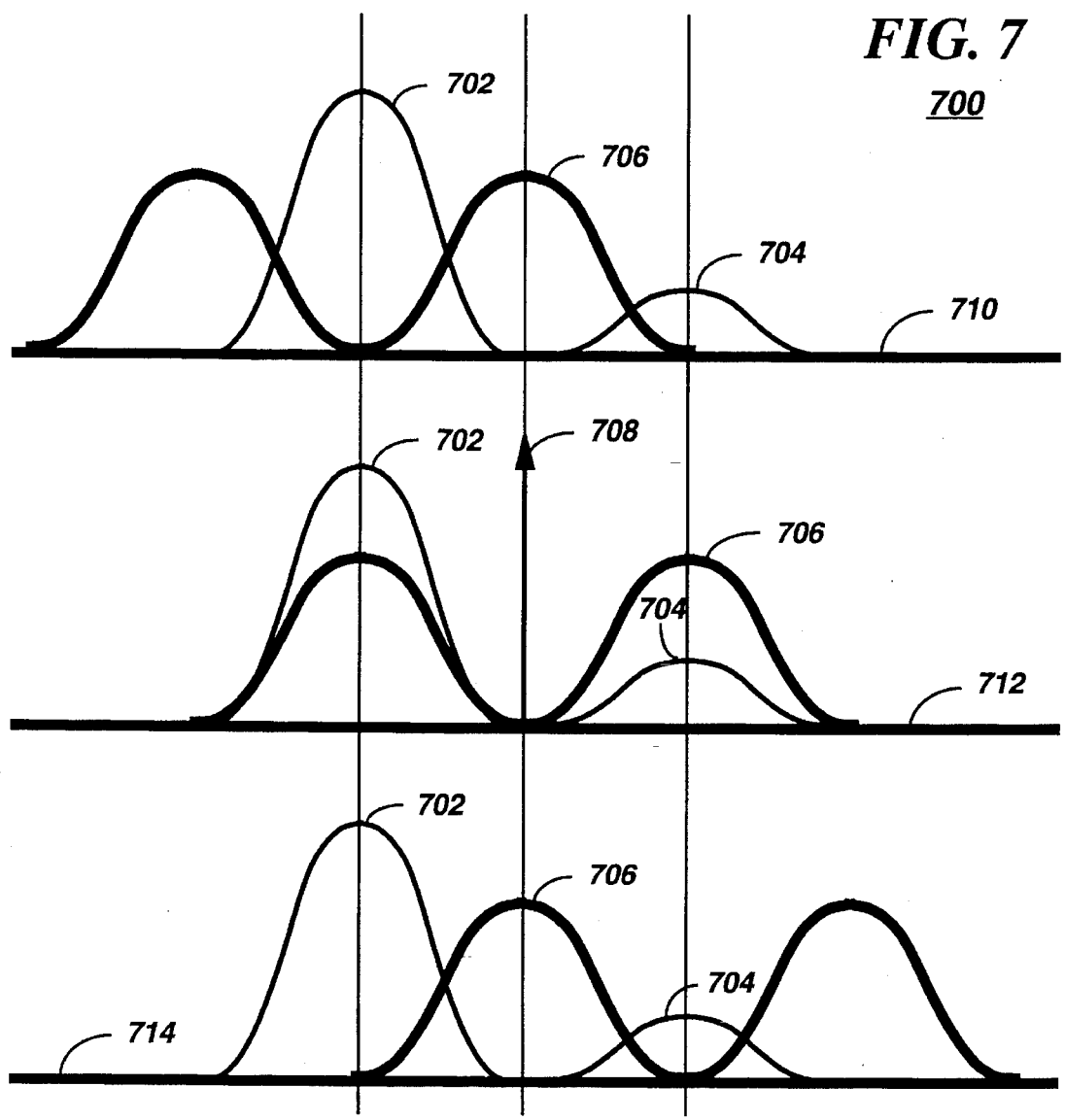
FIG. 7 is a windowing diagram depicting operation of a windowing function utilized by the selective call base station to locate a carrier frequency in accordance with the preferred embodiment of the present invention.

With reference to FIG. 7, a windowing diagram 700 depicts operation of the frequency domain windowing function 706 utilized by the selective call base station 102 to locate a carrier frequency 708 in accordance with the preferred embodiment of the present invention. The windowing diagram 700 depicts operation for a single subchannel utilizing binary FSK modulation. Frequency is represented by the horizontal axes 710, 712, 714. A composite frequency domain signal 702, 704 computed by summing the squares of the magnitudes of the frequency domain signals corresponding to the modulated radio signal received over a predetermined number, e.g., eight, of symbol intervals. The composite frequency domain signal 702, 704 comprises a low frequency portion 702 representing binary "zeroes" received over the predetermined number of symbol intervals, and a high frequency portion 704 representing binary "ones" received over the predetermined number of symbol intervals. It will be appreciated that other types of modulation, e.g., four-level and eight-level FSK can be utilized as well.

The frequency domain windowing function 706 of FIG. 7 for binary modulation has a two-maxima (double-humped) shape that conforms to an expected frequency domain distribution matching that would be expected from a random binary FSK modulation after transmission through a predetermined multipath environment. A multipath environment introduces time-varying delays in radio transmission, which result in a widening of the received frequency domain distribution. The received frequency domain distribution is also affected by such variables as the symbol rate of the transmission and the sampling rate of the A/D converter. The shape to be utilized for the frequency domain windowing function 706 can, for example, be determined empirically by generating a random FSK transmission utilizing a modulation type and symbol rate corresponding to that of the system being calibrated. The random FSK transmission is then passed through the predetermined multipath environment, and received by a receiver similar to that utilized by the system being calibrated. The frequency domain signals received can then be evaluated to determine the expected frequency domain distribution. It will be appreciated that the shape of the frequency domain windowing function 706 can be determined by other methods, as well, e.g., mathematical computation and computer simulation. It will be further appreciated that the frequency domain windowing function 706 also can be made somewhat wider to accommodate any expected variations in transmitter deviation among the selective call receivers 110.

In the view depicted on the horizontal axis 710, the two maxima of the frequency domain windowing function 706 are positioned well below the corresponding low and high frequency portions 702, 704 of the composite frequency domain signal. A piecewise multiplication of the frequency domain windowing function 706 and the composite frequency domain signal 702, 704 thus will produce relatively small values. On the other hand, in the view depicted on the horizontal axis 712, the two maxima of the frequency domain windowing function 706 are positioned into alignment with the corresponding low and high frequency portions 702, 704 of the composite frequency domain signal. A piecewise multiplication of the frequency domain windowing function 706 and the composite frequency domain signal 702, 704 thus aligned will produce relatively large values. In the view depicted on the horizontal axis 714, the two maxima of the frequency domain windowing function 706 are positioned well above the corresponding low and high frequency portions 702, 704 of the composite frequency domain signal. A piecewise multiplication of the frequency domain windowing function 706 and the composite frequency domain signal 702, 704 at this position will produce relatively small values.

Thus it should be clear from FIG. 7 that the largest values that can result from the piecewise multiplication of the frequency domain windowing function 706 and the composite frequency domain signal 702, 704 will occur when the maxima of the frequency domain windowing function 706 are positioned into alignment with the corresponding portions 702, 704 of the composite frequency domain signal, as in the view depicted on the horizontal axis 712. The preceding fact is utilized by the preferred embodiment of the present invention to estimate the carrier frequency of the subchannel by convolving the composite frequency domain signal 702, 704 with the frequency domain windowing function 706 as described below.

First, the frequency domain windowing function 706 is centered at a first frequency index within the predetermined tolerance range of the carrier frequency. Then a pointwise multiplication of the composite frequency domain signal 702, 704 by the frequency domain windowing function 706 centered at the frequency index is computed to obtain a plurality of windowed energy values. Next, the plurality of windowed energy values is totaled to obtain a total energy value corresponding to the frequency index. The total energy value and the corresponding frequency index are recorded in the memory 310. Thereafter, the frequency domain windowing function 706 is shifted to recenter it at a next frequency index that has not yet been recorded. The computing, totaling, recording, and shifting steps are repeated to form a plurality of recorded total energy values until every frequency index within the predetermined tolerance range has been recorded. Next, the plurality of recorded total energy values are compared with one another to find the largest recorded total energy value, and the location of the frequency distribution of frequency domain samples corresponding to the predetermined frequency offsets is determined to be centered on the frequency index corresponding to the largest recorded total energy value. For a balanced type of modulation such as binary FSK utilizing equal offsets from the carrier for "one" and "zero", the carrier frequency 708 is estimated to be at the frequency index corresponding to the largest recorded total energy value.

It is important to note that the frequency domain windowing function 706 advantageously estimates the carrier frequency correctly, even when there is an imbalance between the number of symbols of each type received, e.g., more "zeroes" than "ones" are received, as depicted in FIG. 7. The ability of the preferred embodiment of the present invention to estimate the carrier frequency correctly in the presence of an imbalance among the number of symbols of each type received represents a major advantage over the prior art.

Figure 8:
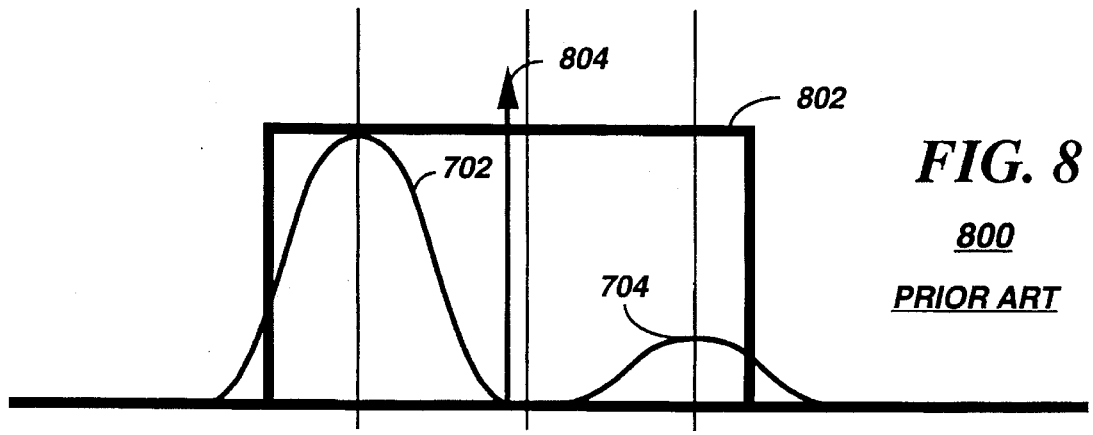
FIG. 8 is a diagram depicting a prior art windowing function.

With reference to FIG. 8, a diagram depicts a prior art rectangular windowing function 802. The prior art rectangular windowing function 802 has been utilized with the composite frequency domain signal 702, 704 in an attempt to estimate the carrier frequency by finding the location of the window that produces the largest total windowed energy. Unlike the preferred embodiment of the present invention, the estimate made by the prior art rectangular windowing function 802 is adversely affected by an imbalance among the number of symbols of each type received. More specifically, the prior art rectangular windowing function 802 skews the estimate of the carrier frequency 804 towards the most frequently received symbol value(s), which can result in degraded and erroneous symbol decisions.

Figure 9:
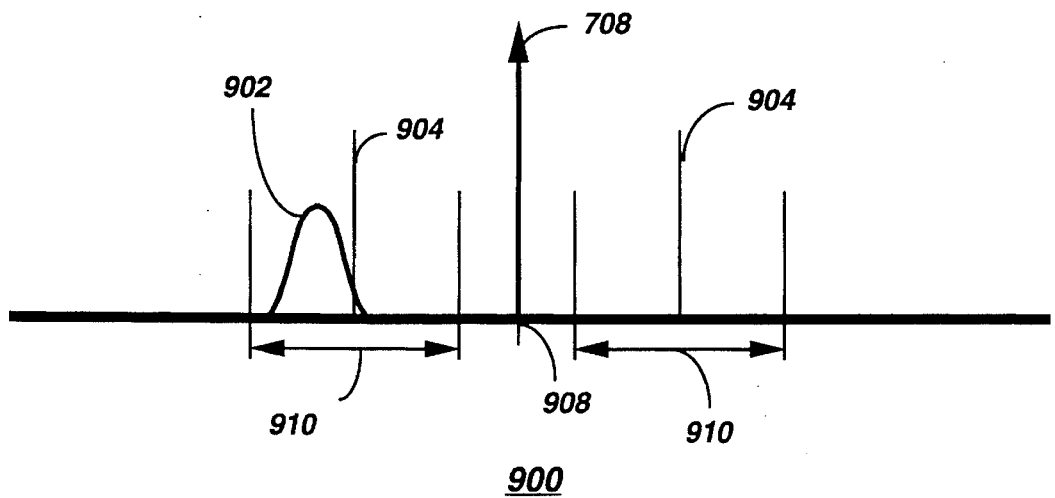
FIG. 9 is a demodulation diagram depicting symbol demodulation in accordance with the preferred embodiment of the present invention.

With reference to FIG. 9, a demodulation diagram 900 depicts symbol demodulation in accordance with the preferred embodiment of the present invention. Once the carrier frequency 708 has been estimated by the carrier frequency estimator 322, the symbol value corresponding to each symbol interval is demodulated as follows.

The selector 328 selects as an evaluation locus 904 a frequency equal to one of the M predetermined frequency offsets from the estimate of the received carrier frequency 708. Next, the choosing element 330 computes magnitude square values of samples of the frequency domain signal 902 corresponding to the one of the serially transmitted symbol intervals over a predetermined frequency range 910 centered on the evaluation locus 904, thereby generating a plurality of energy values associated with the one of the M predetermined frequency offsets. It will be appreciated that the predetermined frequency range 910 is chosen to accommodate expected variations in transmitted deviation, as well as frequency variations caused by transmission through a multipath environment. Such variations can skew the frequency domain signal 902 to either side of the evaluation locus 904, as is depicted in the demodulation diagram 900.

The first totaling element 332 totals the plurality of energy values to obtain a total energy value corresponding to the one of the M predetermined frequency offsets. The first recording element 334 records the total energy value and the corresponding one of the M predetermined frequency offsets. The second repeat element 336 repeats the selecting, computing, totaling, and recording until the total energy value corresponding to each of the M predetermined frequency offsets has been computed and recorded. The first comparator 338 then compares the total energy value corresponding to each of the M predetermined frequency offsets to determine the largest total energy value. The designator element 340 designates the symbol value that corresponds to the one of the M predetermined frequency offsets having the largest total energy value as the symbol value demodulated during the one of the serially transmitted symbol intervals.

Figure 10:
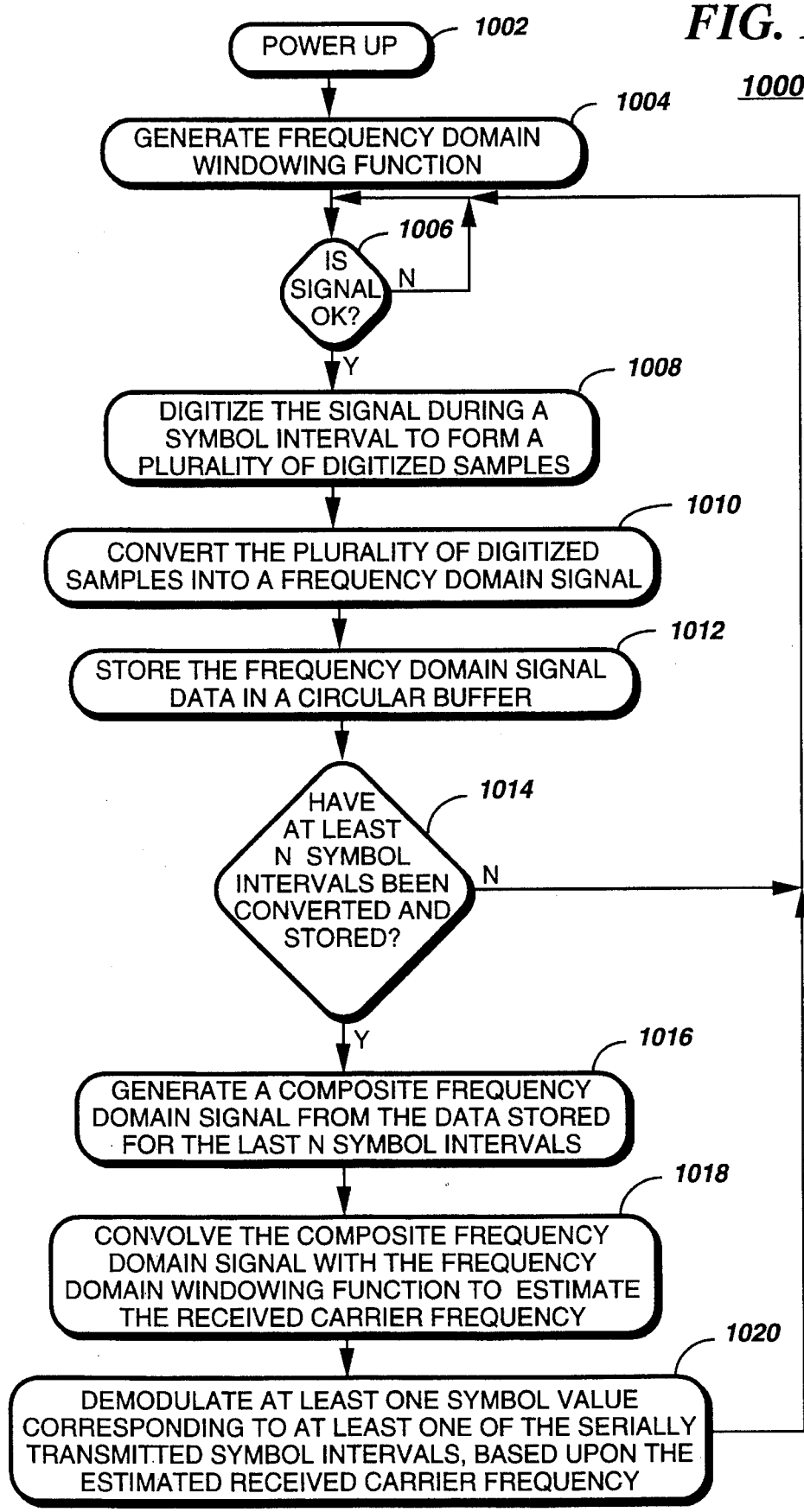
FIG. 10 is a flow chart of operation of the selective call base station in accordance with the preferred embodiment of the present invention.

With reference to FIG. 10, a flow chart of operation of the selective call base station 102 for processing a single subchannel in accordance with the preferred embodiment of the present invention begins with power up 1002. After power up, the windowing function generator 316 generates 1004 a frequency domain windowing function that, when applied to a frequency domain signal, increases sensitivity to frequency domain samples having frequency offsets corresponding to the predetermined frequency offsets. Next, the controller 206 controls the quadrature symbol demodulator 214 to monitor 1006 the subchannels for at least one signal that has a sufficiently good signal-to-noise ratio. It will be appreciated by one of ordinary skill in the art that such monitoring can be performed, for example, in the DSP 218 by comparing the signal energy in the information channel of each subchannel to the noise energy within guard bands on either side of the information channel.

If at least one subchannel has an adequate signal, the A/D converter 220 digitizes 1008 the signal during a serially transmitted symbol interval to form a plurality of digitized samples. The frequency domain converter 302 then converts 1010 the plurality of digitized samples into a frequency domain signal comprising a plurality of frequency domain samples. The DSP 218 stores 1012 the frequency domain signal in a circular buffer in the memory 310. The DSP 218 checks 1014 to determine whether at least N symbol intervals have been converted and stored for the subchannel (N=8, for example). If not, the flow returns to step 1006 to collect more data.

If at least N symbol intervals have been converted and stored, the summing element 314 generates 1016 a composite frequency domain signal from the data stored for the last N symbol intervals. The convolving element 342 then convolves 1018 the composite frequency domain signal with the frequency domain windowing function to estimate the received carrier frequency, as described in detail herein above in accordance with the preferred embodiment of the present invention. The symbol demodulator 324 then demodulates 1020 at least one symbol value corresponding to at least one of the serially transmitted symbol intervals, based upon the estimated carrier frequency, as is also described in detail herein above.

Figure 11:
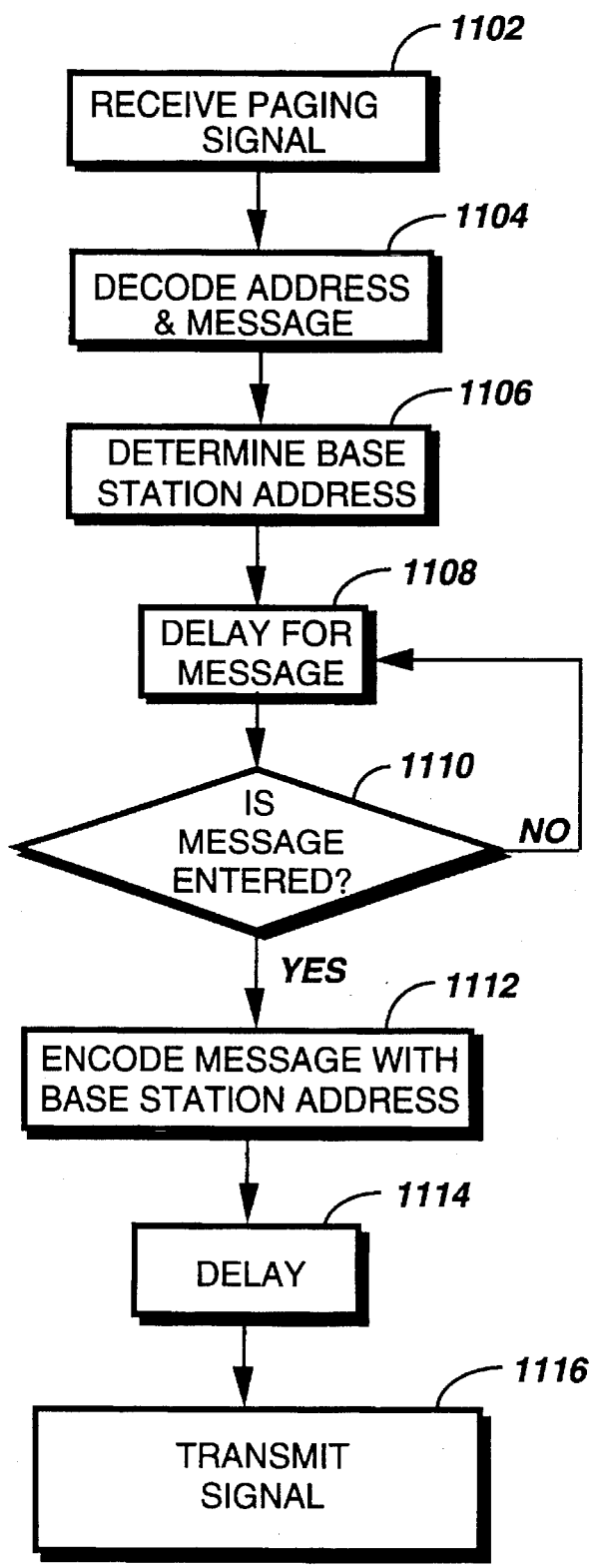
FIG. 11 is a flow chart of the operation of the selective call receiver in accordance with the preferred embodiment of the present invention.

FIG. 11 is a flow chart illustrating the operation of the selective call receiver 110 in accordance with the preferred embodiment of the present invention. The selective call receiver 110 receives the paging signal from the selective call base station 102, step 1102, and decodes its address and a message, if any, contained therein, step 1104. The paging signal preferably comprises a time of transmission which is also decoded, step 1104, to enable the selective call receiver 110 to calculate a delay time before it responds by sending the acknowledgment response. The address of the selective call base station 102 is also decoded from the received paging signal, step 1106. The selective call receiver 110 delays until a message is entered or until the time to transmit the acknowledgment response, step 1108. Preferably, the selective call receiver 110 provides an option to enable the user to enter, by techniques well known in the art, a message to be incorporated in the acknowledgment response, step 1110. If the message is not entered or the time to transmit has not elapsed, the process continues to step 1108. Alternatively, if a message is entered, the message is encoded with the address of the selective call base station 102, step 1112, or if the time has elapsed, the acknowledgment signal is encoded with a default message. In some instances, the selective call receiver 110 may not need to receive an address from the transmitting selective call base station 102, and simply transmits its message on its preassigned subchannel to the selective call base station 102. Upon receipt and encoding of the acknowledgment message, the selective call receiver 110 delays until its time to transmit the acknowledgment response, step 1114. The acknowledgment response is then transmitted to the selective call base station 102, step 1116. In this way, the plurality of selective call receivers 110 respond substantially simultaneously with one another.

Thus, it should be apparent by now that the preferred embodiment of the present invention provides a method and apparatus that can produce an improved estimate of the carrier frequency of the subchannels received by a multiple-subchannel, non-coherent, frequency shift keyed (FSK) receiver. The present invention advantageously performs well even in the presence of an imbalance in the types of symbols transmitted. The present invention advantageously provides a higher accuracy of symbol decoding in the non-coherent FSK receiver.

What is claimed is:

1. A method for estimating a received carrier frequency and for demodulating a symbol value associated with the carrier frequency, the method utilized in a frequency shift keyed (FSK) receiver for receiving a modulated radio signal comprising symbol values corresponding to predetermined frequency offsets from the received carrier frequency, the symbol values received during serially transmitted symbol intervals, the method comprising the steps of:

digitizing the modulated radio signal during a symbol interval to form a plurality of digitized samples corresponding to the modulated radio signal over the symbol interval;

converting the plurality of digitized samples into a frequency domain signal corresponding to the modulated radio signal, the frequency domain signal comprising a first plurality of frequency domain samples corresponding to a plurality of frequencies identified by a plurality of frequency indexes;

storing the first plurality of frequency domain samples in the frequency shift keyed receiver;

repeating the digitizing, converting, and storing steps for a predetermined number of the serially transmitted symbol intervals to obtain a second plurality of frequency domain samples corresponding to the predetermined number of the serially transmitted symbol intervals;

summing squares of magnitudes of the second plurality of frequency domain samples stored for each of the corresponding plurality of frequencies to generate a composite frequency domain signal corresponding to the modulated radio signal received over the predetermined number of the serially transmitted symbol intervals;

generating a frequency domain windowing function that increases sensitivity to frequency domain samples having frequency offsets corresponding to the predetermined frequency offsets;

convolving the composite frequency domain signal generated in the summing step with the frequency domain windowing function to determine a location of a frequency distribution of frequency domain samples, which frequency distribution corresponds to the predetermined frequency offsets;

making an estimate of the received carrier frequency from the location determined in the convolving step; and demodulating the symbol value corresponding to one of the serially transmitted symbol intervals, based upon the estimate of the received carrier frequency.

2. The method of claim 1, wherein the generating step comprises the step of conforming the frequency domain windowing function to an expected frequency domain distribution that matches that expected from a random FSK modulation after transmission through a predetermined multipath environment.

3. The method of claim 2, wherein the modulated radio signal comprises M possible symbol values corresponding to M predetermined frequency offsets from the received carrier frequency, and wherein the generating step comprises the step of constructing the frequency domain windowing function such that, when the frequency domain windowing function is centered with respect to the received carrier frequency, the frequency domain windowing function comprises M maxima that are coincident with the M predetermined frequency offsets.

4. The method of claim 3, wherein the demodulating step comprises the steps of:

selecting as an evaluation locus a frequency equal to one of the M predetermined frequency offsets from the estimate of the received carrier frequency;

choosing magnitude square values of samples of the frequency domain signal corresponding to the one of the serially transmitted symbol intervals over a predetermined frequency range centered on the evaluation locus, thereby forming a plurality of energy values associated with the one of the M predetermined frequency offsets;

totaling the plurality of energy values to obtain a total energy value corresponding to the one of the M predetermined frequency offsets;

recording the total energy value and the corresponding one of the M predetermined frequency offsets;

repeating the selecting, choosing, totaling, and recording steps until the total energy value corresponding to each of the M predetermined frequency offsets has been recorded;

comparing the total energy value corresponding to each of the M predetermined frequency offsets to determine a largest total energy value; and designating the symbol value that corresponds to the one of the M predetermined frequency offsets having the largest total energy value as the symbol value demodulated during the one of the serially transmitted symbol intervals.

5. The method of claim 1, wherein the received carrier frequency can have a value above and below a nominal design carrier frequency within a predetermined tolerance range due to variations in transmitter and receiver frequency references, and wherein the convolving step comprises the steps of:

centering the frequency domain windowing function at one of the plurality of frequency indexes within the predetermined tolerance range;

computing a pointwise multiplication of the composite frequency domain signal by the frequency domain windowing function centered at the one of the plurality of frequency indexes to obtain a plurality of windowed energy values;

totaling the plurality of windowed energy values to obtain a total energy value corresponding to the one of the plurality of frequency indexes;

recording the total energy value and the corresponding frequency index in a memory in the frequency shift keyed receiver;

shifting the frequency domain windowing function to recenter the frequency domain windowing function at a next one of the frequency indexes that has not yet been recorded by the recording step; and repeating the computing, totaling, recording, and shifting steps to form a plurality of recorded total energy values, said repeating continuing until every frequency index within the predetermined tolerance range has been recorded.

6. The method of claim 5, wherein the convolving step further comprises the steps of:

comparing the plurality of recorded total energy values with one another to find a largest recorded total energy value; and determining that the location of the frequency distribution of frequency domain samples corresponding to the predetermined frequency offsets is centered on a frequency index corresponding to the largest recorded total energy value.

7. The method of claim 1, wherein the converting step comprises the steps of:

increasing the plurality of digitized samples to an integer power of two; and performing a Fast Fourier Transform (FFT) on the plurality of digitized samples to generate the first plurality of frequency domain samples corresponding to the plurality of frequencies.

8. The method of claim 7, wherein the converting step further comprises the step of windowing the plurality of digitized samples by applying a Hanning window prior to the step of increasing the plurality of digitized samples to an integer power of two.

9. An apparatus for estimating a received carrier frequency and for demodulating a symbol value associated with the carrier frequency, the apparatus utilized within a frequency shift keyed (FSK) receiver for receiving a modulated radio signal comprising symbol values corresponding to predetermined frequency offsets from the received carrier frequency, the symbol values received during serially transmitted symbol intervals, the apparatus comprising:

an analog-to-digital (A/D) converter for digitizing the modulated radio signal during a symbol interval to form a plurality of digitized samples corresponding to the modulated radio signal over the symbol interval;

a frequency domain converter coupled to the A/D converter for converting the plurality of digitized samples into a frequency domain signal corresponding to the modulated radio signal, the frequency domain signal comprising a first plurality of frequency domain samples corresponding to a plurality of frequencies identified by a plurality of frequency indexes;

a memory coupled to the frequency domain converter for storing the first plurality of frequency domain samples in the frequency shift keyed receiver;

a first repeater coupled to the A/D converter and coupled to the frequency domain converter and to the memory for repeating the digitizing, converting, and storing for a predetermined number of the serially transmitted symbol intervals to obtain a second plurality of frequency domain samples corresponding to the predetermined number of the serially transmitted symbol intervals;

a summing element coupled to the memory for summing squares of magnitudes of the second plurality of frequency domain samples stored for each of the corresponding plurality of frequencies to generate a composite frequency domain signal corresponding to the modulated radio signal received over the predetermined number of the serially transmitted symbol intervals;

a windowing function generator for generating a frequency domain windowing function that increases sensitivity to frequency domain samples having frequency offsets corresponding to the predetermined frequency offsets;

a convolving element coupled to the summing element and coupled to the windowing function generator for convolving the composite frequency domain signal generated by the summing element with the frequency domain windowing function to determine a location of a frequency distribution of frequency domain samples, which frequency distribution corresponds to the predetermined frequency offsets;

a carrier frequency estimator coupled to the convolving element for making an estimate of the received carrier frequency from the location determined by the convolving element; and a symbol demodulator coupled to the carrier frequency estimator for demodulating the symbol value corresponding to one of the serially transmitted symbol intervals, based upon the estimate of the received carrier frequency.

10. The apparatus of claim 9, wherein the windowing function generator comprises a conforming element for conforming the frequency domain windowing function to an expected frequency domain distribution that matches that expected from a random FSK modulation after transmission through a predetermined multipath environment.

11. The apparatus of claim 10, wherein the modulated radio signal comprises M possible symbol values corresponding to M predetermined frequency offsets from the received carrier frequency, and wherein the windowing function generator comprises a maxima coincidence element for constructing the frequency domain windowing function such that, when the frequency domain windowing function is centered with respect to the received carrier frequency, the frequency domain windowing function comprises M maxima that are coincident with the M predetermined frequency offsets.

12. The apparatus of claim 11, wherein the symbol demodulator comprises:

a selector coupled to the carrier frequency estimator for selecting as an evaluation locus a frequency equal to one of the M predetermined frequency offsets from the estimate of the received carrier frequency;

a choosing element coupled to the selector for choosing magnitude square values of samples of the frequency domain signal corresponding to the one of the serially transmitted symbol intervals over a predetermined frequency range centered on the evaluation locus, thereby forming a plurality of energy values associated with the one of the M predetermined frequency offsets;

a first totaling element coupled to the choosing element for totaling the plurality of energy values to obtain a total energy value corresponding to the one of the M predetermined frequency offsets;

a first recording element coupled to the first totaling element for recording the total energy value and the corresponding one of the M predetermined frequency offsets;

a second repeater coupled to the selector, the first choosing element, the first totaling element, and the first recording element for repeating the selecting, choosing, totaling, and recording until the total energy value corresponding to each of the M predetermined frequency offsets has been recorded;

a first comparator coupled to the memory for comparing the total energy value corresponding to each of the M predetermined frequency offsets to determine a largest total energy value; and a designator element coupled to the first comparator for designating the symbol value that corresponds to the one of the M predetermined frequency offsets having the largest total energy value as the symbol value demodulated during the one of the serially transmitted symbol intervals.

13. The apparatus of claim 9, wherein the received carrier frequency can have a value above and below a nominal design carrier frequency within a predetermined tolerance range due to variations in transmitter and receiver frequency references, and wherein the convolving element comprises:

a centering element for centering the frequency domain windowing function at one of the plurality of frequency indexes within the predetermined tolerance range;

a second pointwise multiplier coupled to the centering element for computing a pointwise multiplication of the composite frequency domain signal by the frequency domain windowing function centered at the one of the plurality of frequency indexes to obtain a plurality of windowed energy values;

a second totaling element coupled to the second pointwise multiplier for totaling the plurality of windowed energy values to obtain a total energy value corresponding to the one of the plurality of frequency indexes;

a second recording element coupled to the second totaling element for recording in the memory the total energy value and the corresponding one of the plurality of frequency indexes;

a shifter coupled to the centering element for shifting the frequency domain windowing function to recenter the frequency domain windowing function at a next one of the plurality of frequency indexes that has not yet been recorded by the second recording element; and a third repeater coupled to the second pointwise multiplier, the second totaling element, the second recording element, and the shifter for repeating the pointwise multiplication, totaling, recording, and shifting to form a plurality of recorded total energy values, said repeating continuing until every frequency index within the predetermined tolerance range has been recorded.

14. The apparatus of claim 13, wherein the convolving element further comprises:

a second comparator coupled to the memory for comparing the plurality of recorded total energy values with one another to find a largest recorded total energy value; and a determination element coupled to the second comparator for determining that the location of the frequency distribution of frequency domain samples corresponding to the predetermined frequency offsets is centered on a frequency index corresponding to the largest recorded total energy value.

15. The apparatus of claim 9, wherein the frequency domain converter comprises:

a zero-pad element coupled to the memory for increasing the plurality of digitized samples to an integer power of two; and a Fast Fourier Transform element coupled to the memory for performing a Fast Fourier Transform on the plurality of digitized samples after zero-padding to generate the first plurality of frequency domain samples corresponding to the plurality of frequencies.

16. The apparatus of claim 15, wherein the frequency domain converter further comprises a windowing element coupled to the memory for windowing the plurality of digitized samples by applying a Hanning window prior to increasing the plurality of digitized samples to an integer power of two.

17. A selective call base station for use in a selective call communication system, the selective call base station comprising:

a controller for controlling the selective call base station;

a transmitter coupled to the controller for transmitting selective call signals to selective call receivers operating in the selective call communication system;

a receiver coupled to the controller for receiving a modulated radio signal from a transmitter within one of the selective call receivers, the modulated radio signal communicating symbol values corresponding to predetermined frequency offsets from a received carrier frequency of the modulated radio signal, the symbol values received during serially transmitted symbol intervals, the receiver also coupled to an apparatus for estimating the received carrier frequency and for demodulating the symbol values associated with the received carrier frequency, the apparatus comprising:

an analog-to-digital (A/D) converter for digitizing the modulated radio signal during a symbol interval to form a plurality of digitized samples corresponding to the modulated radio signal over the symbol interval;

a frequency domain converter coupled to the A/D converter for converting the plurality of digitized samples into a frequency domain signal corresponding to the modulated radio signal, the frequency domain signal comprising a first plurality of frequency domain samples corresponding to a plurality of frequencies identified by a plurality of frequency indexes;

a memory coupled to the frequency domain converter for storing the first plurality of frequency domain samples in the frequency shift keyed receiver;

a first repeater coupled to the A/D converter and coupled to the frequency domain converter and to the memory for repeating the digitizing, converting, and storing for a predetermined number of the serially transmitted symbol intervals to obtain a second plurality of frequency domain samples corresponding to the predetermined number of the serially transmitted symbol intervals;

a summing element coupled to the memory for summing squares of magnitudes of the second plurality of frequency domain samples stored for each of the corresponding plurality of frequencies to generate a composite frequency domain signal corresponding to the modulated radio signal received over the predetermined number of the serially transmitted symbol intervals;

a windowing function generator for generating a frequency domain windowing function that increases sensitivity to frequency domain samples having frequency offsets corresponding to the predetermined frequency offsets;

a convolving element coupled to the summing element and coupled to the windowing function generator for convolving the composite frequency domain signal generated by the summing element with the frequency domain windowing function to determine a location of a frequency distribution of frequency domain samples, which frequency distribution corresponds to the predetermined frequency offsets;

a carrier frequency estimator coupled to the convolving element for making an estimate of each of the received carrier frequencies from the location determined by the convolving element; and a symbol demodulator coupled to the carrier frequency estimator for demodulating a symbol value corresponding to one of the serially transmitted symbol intervals, based upon the estimate of the received carrier frequency.

18. The selective call base station of claim 17, wherein the windowing function generator comprises a conforming element for conforming the frequency domain windowing function to an expected frequency domain distribution that matches that expected from a random FSK modulation after transmission through a predetermined multipath environment.

19. The selective call base station of claim 18, wherein the modulated radio signal comprises M possible symbol values corresponding to M predetermined frequency offsets from the received carrier frequency, and wherein the windowing function generator comprises a maxima coincidence element for constructing the frequency domain windowing function such that, when the frequency domain windowing function is centered with respect to the received carrier frequency, the frequency domain windowing function comprises M maxima that are coincident with the M predetermined frequency offsets.

20. The selective call base station of claim 19, wherein the symbol demodulator comprises:

a selector coupled to the carrier frequency estimator for selecting as an evaluation locus a frequency equal to one of the M predetermined frequency offsets from the estimate of the received carrier frequency;

a choosing element coupled to the selector for choosing magnitude square values of samples of the frequency domain signal corresponding to the one of the serially transmitted symbol intervals over a predetermined frequency range centered on the evaluation locus, thereby forming a plurality of energy values associated with the one of the M predetermined frequency offsets;

a first totaling element coupled to the choosing element for totaling the plurality of energy values to obtain a total energy value corresponding to the one of the M predetermined frequency offsets;

a first recording element coupled to the first totaling element for recording the total energy value and the corresponding one of the M predetermined frequency offsets;

a second repeater coupled to the selector, the first choosing element, the first totaling element, and the first recording element for repeating the selecting, choosing, totaling, and recording until the total energy value corresponding to each of the M predetermined frequency offsets has been recorded;

a first comparator coupled to the memory for comparing the total energy value corresponding to each of the M predetermined frequency offsets to determine a largest total energy value; and a designator element coupled to the first comparator for designating the symbol value that corresponds to the one of the M predetermined frequency offsets having the largest total energy value as the symbol value demodulated during the one of the serially transmitted symbol intervals.

21. The selective call base station of claim 17, wherein the received carrier frequency can have a value above and below a nominal design carrier frequency within a predetermined tolerance range due to variations in transmitter and receiver frequency references, and wherein the convolving element comprises:

a centering element for centering the frequency domain windowing function at one of the plurality of frequency indexes within the predetermined tolerance range;

a second pointwise multiplier coupled to the centering element for computing a pointwise multiplication of the composite frequency domain signal by the frequency domain windowing function centered at the one of the plurality of frequency indexes to obtain a plurality of windowed energy values;

a second totaling element coupled to the second pointwise multiplier for totaling the plurality of windowed energy values to obtain a total energy value corresponding to the one of the plurality of frequency indexes;

a second recording element coupled to the second totaling element for recording in the memory the total energy value and the corresponding one of the plurality of frequency indexes;

a shifter coupled to the centering element for shifting the frequency domain windowing function to recenter the frequency domain windowing function at a next one of the plurality of frequency indexes that has not yet been recorded by the second recording element; and a third repeater coupled to the second pointwise multiplier, the second totaling element, the second recording element, and the shifter for repeating the pointwise multiplication, totaling, recording, and shifting to form a plurality of recorded total energy values, said repeating continuing until every frequency index within the predetermined tolerance range has been recorded.

22. The selective call base station of claim 21, wherein the convolving element further comprises:

a second comparator coupled to the memory for comparing the plurality of recorded total energy values with one another to find a largest recorded total energy value; and a determination element coupled to the second comparator for determining that the location of the frequency distribution of frequency domain samples corresponding to the predetermined frequency offsets is centered on a frequency index corresponding to the largest recorded total energy value.

23. The selective call base station of claim 17, wherein the frequency domain converter comprises:

a zero-pad element coupled to the memory for increasing the plurality of digitized samples to an integer power of two; and a Fast Fourier Transform element coupled to the memory for performing a Fast Fourier Transform on the plurality of digitized samples after zero-padding to generate the first plurality of frequency domain samples corresponding to the plurality of frequencies.

24. The selective call base station of claim 23, wherein the frequency domain converter further comprises a windowing element coupled to the memory for windowing the plurality of digitized samples by applying a Hanning window prior to increasing the plurality of digitized samples to an integer power of two.

* * * * *